April 15, 1930.                 H. A. SALLOP                 1,754,770
                                  FASTENER
                             Filed June 28, 1927
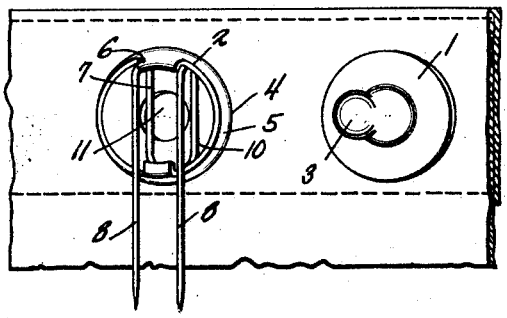
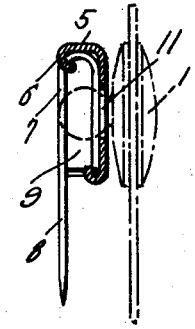
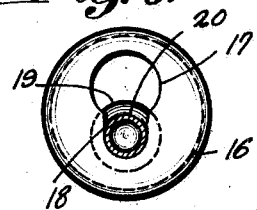
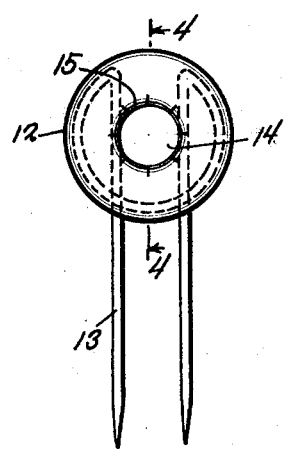
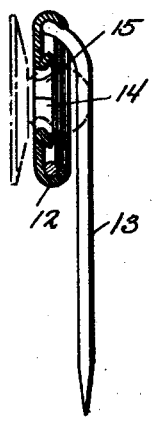
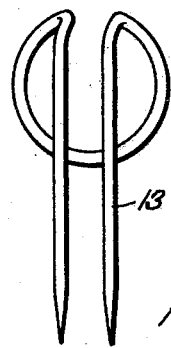
Harry A. Sallop,
INVENTOR.

Patented Apr. 15, 1930

1,754,770

UNITED STATES PATENT OFFICE

HARRY A. SALLOP, OF NEW YORK, N. Y.

FASTENER

Application filed June 28, 1927. Serial No. 202,113.

This invention relates to a fastener and more particularly to that type of fastener used for securing seat covers to the body structure of an automobile and has for its primary object the construction of a device that will more effectively secure the cover to the upholstery of the automobile in such a manner that accidental disengagement between the parts is positively eliminated.

An object of the invention is the designing of the component parts to provide a rigid interlocking connection between the detachable elements when the covers have been properly arranged in place.

Another object of the invention is the construction of a fastener with a pair of spaced penetrating prongs so as to provide a plurality of interengaging connections between the fastener and the upholstery.

A feature of the invention is the novel manner of constructing and associating the component parts of the fastener so as to not only materially reduce the production cost of the device, but to accomplish a more rigid connection therebetween.

With these and other objects in view the invention will be better understood from the following detailed description taken in connection with the accompanying drawings, wherein:

Figure 1 is a perspective view of one type of fastener,

Figure 2 is a vertical sectional view,

Figure 3 is a side elevation of another type of fastener,

Figure 4 is a vertical sectional view on the line 4—4 of Figure 3,

Figure 5 is a perspective view of the pin,

Figure 6 is a view of another form of head structure, and

Figure 7 is a view of another form of head structure.

Again referring to the drawings and more particularly to Figures 1 and 2, it will be noted that the fastener consists of the companion detachable sections 1 and 2, the former of a ball construction to enable the ball 3 to readily snap into engagement with the socket section 4. This socket section 4 comprises a head 5 having a marginal flange 6 for securing the head to the pin 7. It will be noted that the pin 7 is provided with a double prong 8 arranged in spaced relation with each other and with the head 5 to provide a recess 9 for the accommodation of the upholstery or other material to be engaged by the pin. To complete this construction of fastener a pair of snap bars 10 are arranged in a predetermined position relative to the ball receiving opening 11 in the head. The particular structural features of this type of fastener does not enter into the invention as my invention consists broadly in the provision of a pair of companion sections detachably associated, with one section provided with a double prong pin extending in parallel spaced relation with the head portion so as to provide a double gripping engagement with the upholstery or other material engaged thereby. In Figures 3 and 4 I have illustrated a simplified form of fastener including the head 12 and double prong pin 13, the former provided with a central opening 14 surrounded by an annularly arranged series of snap tongues 15. This arrangement of the snap tongues 15 enables the wall of the opening to be expanded or contracted for accommodating the insertion therethrough of the ball of the ball section. Thus it will be appreciated that the cost of manufacture is materially reduced and besides a more effective grip can be accomplished between the wall of the opening and the ball member. In Figure 6 I have illustrated the head 16 as provided with a key slot 17 the restricted portion 18 of which being arranged in the direction of strain so that when the ball 19 is slipped through the enlarged portion of the slot the pull of the cover will locate the neck 20 of the ball in the restricted portion of the slot. This construction provides a rigid non-yieldable interlocking engagement between the companion members at the same time allowing the same to be readily separated when necessary.

For the purpose of bringing about a more effective engagement between the companion members while at the same time taking advantage of a rigid interlocking connection between the members as shown in Figure 7 the head 21 is provided with a slot 22 with which is associated a pair of opposed snap tongues 23 thereby providing the wall of the slot with a yieldable portion and a non-yieldable portion, the latter providing a rigid interlocking engagement with the ball 24 when the parts have been effectively secured together.

It will now be appreciated that I have designed a seat cover fastener that has more than one point of engagement with the upholstery due to the novel arrangement of the penetrating prongs and besides accomplishes a rigid interlocking engagement between the companion members so as to absolutely prevent accidental disengagement of the members. This latter result is brought about by so designing the opening in the head of the member that the ball may be readily snapped into place and then moved to a position to have interlocking engagement with the member.

It is of course, to be understood that the structural details of the various types of fasteners may be changed in various ways to materially reduce the cost of manufacture or to increase the utility thereof, and, therefore, I do not desire to be limited to any particular mechanical construction as the basic feature of my invention resides in the use of a double prong fastener having novel structural features to accomplish a more positive interlocking engagement between the companion member, therefore, I do not desire to be limited in protection in any manner whatsoever except as set forth in the following claim.

What I claim is:

A fastener device comprising a head having a substantially rectangular opening, the wall of which is slit at spaced points to allow portions of the wall to be flexed laterally to allow a stud element to be snapped thereby for movement into abutting relation with the non flexible portion of the wall.

In testimony whereof I affix my signature.

HARRY A. SALLOP.